UNITED STATES PATENT OFFICE.

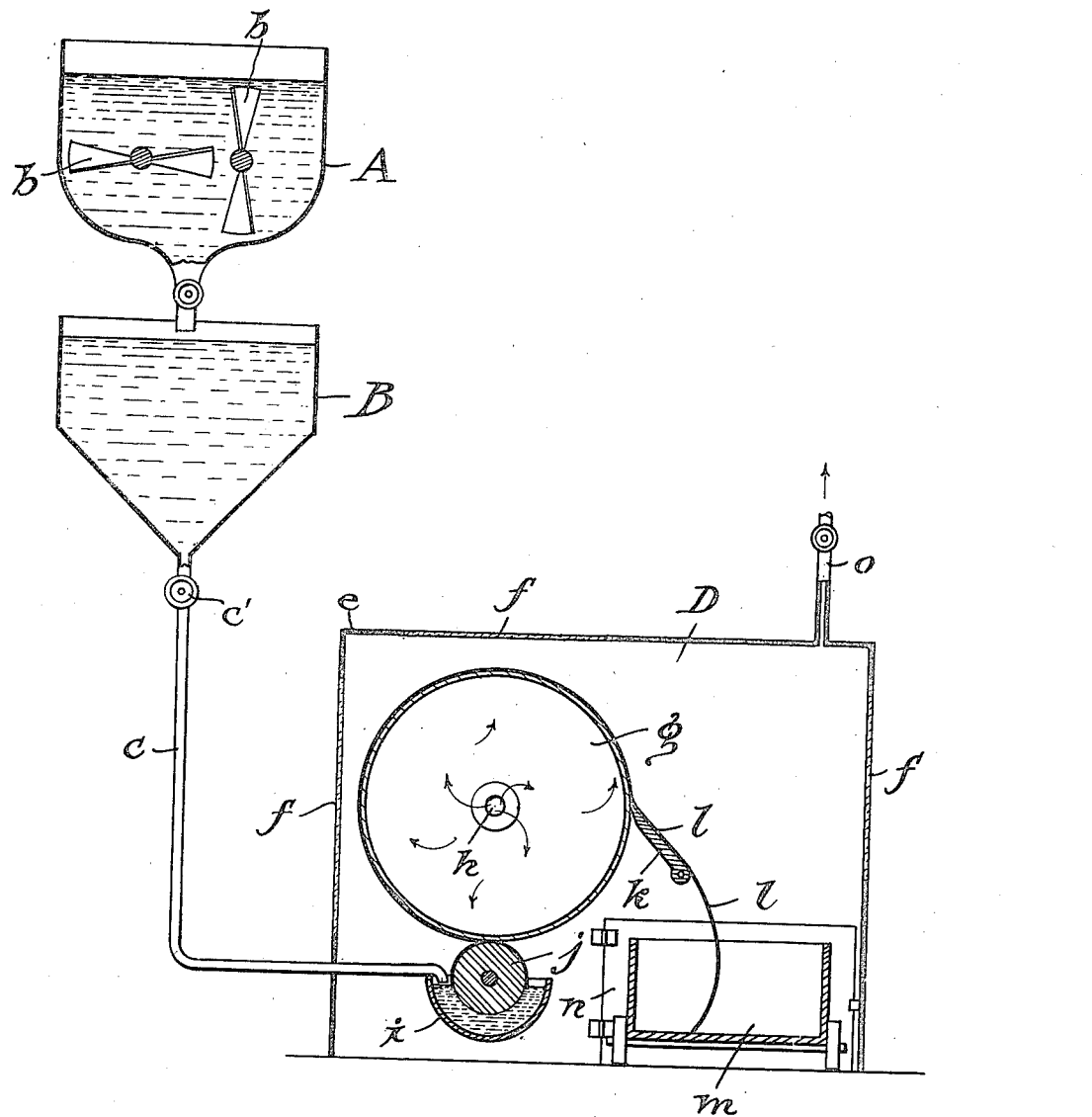

GEORGE C. CONTANT, OF NEW YORK, N. Y., ASSIGNOR OF ONE-HALF TO JOSIAH DECKER, JR., OF MONTCLAIR, NEW JERSEY.

POWDERED-EGG PRODUCT AND PROCESS OF MAKING THE SAME.

1,203,983.

Specification of Letters Patent.

Patented Nov. 7, 1916.

Application filed January 22, 1916. Serial No. 73,587.

*To all whom it may concern:*

Be it known that I, GEORGE C. CONTANT, a citizen of the United States, residing in the city of New York, borough of Manhattan, county and State of New York, have invented certain new and useful Powdered-Egg Products and Processes of Making the Same, of which the following is a specification.

This invention relates to powdered egg products, and the object of the invention is to reduce eggs to powdered form without materially altering their chemical composition or dietetic value. The resulting products have many advantages over the original eggs, in that they can be preserved indefinitely, and the expense of shipment greatly reduced, not only because of the fact that the water of the eggs has been eliminated, thereby dispensing with its transportation, but because of the fact, also, that the expense of packing and crating is obviated. The powdered egg products are adapted for use in the manufacture of cake, pastry, and drinks, as well as for various other culinary purposes.

In the process of making the products, they become thoroughly sterilized, and the sugar used in the process acts as a harmless preservative, as well as contributing to the dietetic value of the products. By my process of manufacture, the sugar and egg constituents are so thoroughly blended or united as to indicate that a possible chemical union has taken place between them, possibly in the form of a saccharate of albumen or an albuminate of sugar.

In practising the invention, I employ any suitable form of vacuum drier, one type of which is shown in the accompanying drawing, which illustrates the apparatus in vertical cross-section. It will be understood, however, that the process may be carried out in forms of apparatus other than the specific one herein shown.

In practically carrying out the invention, the whites and yolks of the eggs are, preferably, first separated, and batches of each operated upon separately. Speaking generally, the whites contain about two-thirds ($\frac{2}{3}$), by weight, of water and one-third ($\frac{1}{3}$) of solids, and the yolks contain substantially one-third ($\frac{1}{3}$), by weight, of water and two-thirds ($\frac{2}{3}$) of solids. As the composition of the solid content of the whites and yolks, respectively, varies to some extent, I have found it desirable to operate upon them separately. However, I can operate on the mixed yolks and whites.

The whites of the eggs are placed in a mixing tank A, provided with agitators $b$, and the agitation continued until the product is thoroughly uniform in consistency and all the customary "stringiness" of the product eliminated. During this agitation, it is very essential that agitators $b$ operate below the surface of the material, in order to avoid all whipping of the whites, or conversion thereof into froth. In this respect, my invention embodies a pronounced improvement over prior processes, wherein the eggs are whipped, as I have found that the whipping operation greatly impairs the product, due to oxidation, or otherwise, and thus destroys its vitality.

After the agitating operation described, to every twenty (20) pounds of the product thus produced I add substantially five and two-thirds ($5\frac{2}{3}$) pounds of sugar, and thoroughly incorporate the same with the egg whites. I am also careful, during this second mixing operation, to avoid any whipping of the mixture. The mixing of the whites and sugar having been accomplished, the resulting products is allowed to stand for about one (1) hour, whereupon there results a perfect blending or chemical union of the sugar with the whites. The whites apparently lose their physical identity, in that they become converted into a syrup, differing very materially in appearance and other characteristics from the whites before they are combined with the sugar.

The commingled whites and sugar are fed from mixing tank A to a delivery tank B, whence they pass through a pipe $c$, controlled by a valve $c'$, into a vacuum drier D. The vacuum drier embodies a casing $e$, which, in order to permit of the drying operation being observed, may be provided with glass panels $f$. Interior of the casing is the drying drum $g$, to which steam or other heating fluid is admitted through pipe $h$, as is common in this type of drier. Beneath drum $g$ is a trough $i$, into which pipe $c$ leads and delivers the mixed whites and sugar. Trough $i$ is provided with a roll $j$, which takes up a film of the material and delivers it to the surface of drum $g$, on which it is dried in the form of a film or pellicle. It is not necessary that delivery tank B be positioned above the drier, as shown in the drawings, since I rely on the vacuum to feed the liquid to trough $i$, and, accordingly, said delivery tank might be positioned on a level with, or even below, the drier.

The apparatus is provided with a knife or scraper $k$, which removes the dried film $l$ from the drum, whence it is deposited in a small car $m$, which is run into the casing of the drier and removed therefrom through a door $n$ provided in the end of casing D. I operate the drier under a very high vacuum, of say twenty-seven (27) or twenty-eight (28) inches, and, for this purpose, the pipe $o$ is connected with any suitable exhausting apparatus.

The steam or hot water is introduced into drum $g$ at a temperature of 160 to 180 degrees Fahrenheit, and this results in a temperature on the exterior of the drum of substantially 130 degrees Fahrenheit, and which is the temperature at which I prefer to conduct the drying operation.

The temperature of operation and the rotation of drum $g$ are so coördinated that the film, upon its removal from the drum, contains substantially two per cent. (2%) of moisture. I find that, operating under these conditions, the film can be readily removed from the drum and deposited in car $m$ in a continuous strip, the further effect of the drying operation in the car operating to remove the residuary two per cent. (2%) of moisture from the film, thereby resulting in a perfectly dry, sterilized product.

When car $m$ contains a suitable charge of the dried product, it is run out of casing D, and the product delivered to a suitable grinding machine whereby it is converted into a powder and thereafter packed in suitable air-tight containers.

The yolks can be treated, to all intents and purposes, in substantially the manner described in connection with the treatment of the whites, except that the speed of rotation of the drier, if the same size drum were used as for drying the whites, would, naturally, be greater, in order to compensate for the lesser quantity of water in the yolks. The mixed yolks and whites may be similarly treated, making due allowance for the speed of rotation of the drying cylinder.

After the whites and yolks have been prepared as described, they may be used either separately or mixed in any desired proportions. Instead of using granulated sugar as the preservative, I may, and preferably do for certain purposes, employ other sweetening agents, such as malt sugar, grape sugar, or glucose. If malt sugar is employed, the digestibility of the product is very materially increased, and I have found it of great advantage to make a tablet containing both the whites and yolks, in any predetermined proportions, and with the proper content of malt sugar. For some purposes, I combine the malt sugar with either the whites or yolks separately.

I am aware that it is not broadly new to produce a mixture containing dried egg powder and sugar, but the products of this character in the prior art, so far as I am aware, have been produced by a heating process, as well as manipulated in other ways differently from my process as hereinbefore described. Moreover, the resulting products were not so permanent or soluble as mine, notwithstanding the proportion of sugar used in such products was much larger than in mine.

Having thus fully described the invention, what I claim as new, and desire to secure by Letters Patent, is:

1. The process of producing a desiccated egg product which consists in separating the yolks from the whites, agitating one of the thus separated parts, without whipping the same, until it is of uniform consistency, adding a preservative thereto, and then desiccating the mixture at a temperature below 212 degrees Fahrenheit.

2. The process of producing a desiccated egg product which consists in separating the yolks from the whites, agitating one of the thus separated parts, without whipping the same, until it is of uniform consistency, adding a preservative thereto, desiccating the mixture at a temperature below 212 degrees Fahrenheit, and then reducing it to a powder.

3. The process of producing a desiccated egg product which consists in separating the yolks from the whites, agitating one of the thus separated parts, without whipping the same, until it is free from all stringiness, adding sugar thereto, and then desiccating the mixture at a temperature below 212 degrees Fahrenheit.

4. The process of producing a desiccated egg product which consists in separating the yolks from the whites, agitating one of the thus separated parts, without whipping the same, until it is free from all stringiness, adding sugar thereto, desiccating the mixture at a temperature below 212 degrees Fahrenheit, and then reducing it to a powder.

5. The process of producing a desiccated egg product which consists in separating the yolks from the whites, agitating the whites, without whipping the same, until they are free from all stringiness, adding sugar thereto, and then desiccating the mixture at a temperature below 212 degrees Fahrenheit.

6. The process of producing a desiccated egg product which consists in separating the yolks from the whites, agitating the whites, without whipping the same, until they are free from all stringiness, adding sugar thereto, desiccating the mixture at a temperature below 212 degrees Fahrenheit, and then reducing it to a powder.

7. The process of producing a desiccated egg product which consists in separating the yolks from the whites, agitating the whites until all stringiness is removed, adding sugar thereto, allowing the mixed sugar and eggs to stand until the sugar has been dissolved, and then desiccating the mixture.

8. The process of producing a desiccated egg product which consists in separating the yolks from the whites, agitating the whites until all stringiness is removed, adding sugar thereto, allowing the mixed sugar and eggs to stand until the sugar and eggs become thoroughly blended, desiccating the mixture, and then powdering the dried product.

9. The process which consists in separating the whites from the yolks of eggs, mixing a preservative with one of the separated parts, desiccating it on a suitable drying surface to a point where it contains substantially two per cent. of moisture, removing the film thus produced from the drying surface, and then further desiccating the product until all its moisture is removed.

10. The process which consists in separating the whites from the yolks of eggs, mixing a preservative with one of the separated parts, desiccating it on a suitable drying surface to a point where it contains substantially two per cent. of moisture, removing the film thus produced from the drying surface, further desiccating the product until all its moisture is removed, and then powdering the same.

11. The herein described egg product consisting of one of the constituents of an egg in powdered form, each particle of which contains the egg constituent uniformly blended and united with sugar.

12. The herein described egg product consisting of one of the constituents of an egg in powdered form, each particle of which contains the egg constituent uniformly blended and united with sugar, the percentage of sugar in said product not exceeding thirty per cent.

13. The herein described egg product consisting of the whites of eggs in powdered form, each particle of which contains the egg constituent uniformly blended and united with sugar.

14. The herein described egg product consisting of the whites of eggs in powdered form, each particle of which contains the egg constituent uniformly blended and united with malt sugar.

15. The herein described egg product consisting of desiccated eggs and sugar in tablet form, each of the particles of which tablet contains eggs and sugar thoroughly blended.

16. The herein described egg product consisting of desiccated eggs and malt sugar in tablet form, each of the particles of which tablet contains eggs and sugar thoroughly blended.

In testimony whereof I have signed my name to this specification.

GEORGE C. CONTANT.